(12) United States Patent
Yeh

(10) Patent No.: US 11,453,198 B2
(45) Date of Patent: Sep. 27, 2022

(54) FOAM PRODUCT AND MANUFACTURING METHOD THEREOF

(71) Applicant: Tzong In Yeh, Dana Point, CA (US)

(72) Inventor: Tzong In Yeh, Dana Point, CA (US)

( * ) Notice: Subject to any disclaimer, the term of this patent is extended or adjusted under 35 U.S.C. 154(b) by 0 days.

(21) Appl. No.: 16/953,678

(22) Filed: Nov. 20, 2020

(65) Prior Publication Data
US 2022/0118661 A1 Apr. 21, 2022

(30) Foreign Application Priority Data

Oct. 16, 2020 (TW) .................................. 109136045

(51) Int. Cl.
*B32B 5/18* (2006.01)
*A63C 5/12* (2006.01)
(Continued)

(52) U.S. Cl.
CPC ................. *B32B 5/18* (2013.01); *A63C 5/12* (2013.01); *A63C 5/122* (2013.01); *A63C 5/126* (2013.01); *B29C 44/06* (2013.01); *B29C 44/14* (2013.01); *B29C 44/3426* (2013.01); *B29C 48/0012* (2019.02); *B29C 48/0021* (2019.02); *B29C 48/07* (2019.02); *B32B 27/065* (2013.01); *B32B 27/08* (2013.01); *B32B 27/32* (2013.01);
(Continued)

(58) Field of Classification Search
CPC .......... A63C 5/12; A63C 5/122; A63C 5/124; A63C 5/126; A63C 5/128; B32B 5/18; B32B 5/20; B32B 27/065; B32B 27/08; B32B 27/32; B32B 2266/025; B29C 44/06; B29C 44/14; B29C 44/3426; B29C 48/0012; B29C 48/0021; B29C 48/07; B29K 2023/06; B29K 2023/12; B29K 2105/048; B29L 2031/5272
See application file for complete search history.

(56) References Cited

U.S. PATENT DOCUMENTS 5,275,860 A * 1/1994 D'Luzansky ........... B63B 32/22
441/74
5,649,717 A * 7/1997 Augustine ................ A63C 5/03
280/610
(Continued)

FOREIGN PATENT DOCUMENTS

CN 101156986 A 4/2008
EP 2689816 A1 1/2014
(Continued)

*Primary Examiner* — Walter Aughenbaugh
(74) *Attorney, Agent, or Firm* — Muncy, Geissler, Olds & Lowe, P.C.

(57) ABSTRACT

The present invention disclosed a foam product and the manufacturing method thereof. The foam product includes a foam core, an outer skin, a cross-linked foam sheet and a bottom plate, wherein the aforementioned layers are all pre-made. The cross-linked foam sheet is laminated onto a bottom surface of the foam core, and the outer skin is then laminated onto a top surface and a periphery of the foam core. Lastly, the bottom plate is laminated onto the cross-linked foam sheet, wherein, the bottom plate has a non cross-linked foam sheet and a non-foam plastic plate, so that when the bottom plate is laminated onto the crossed-link foam sheet, the non cross-linked foam sheet is sandwiched between the cross-linked foam sheet and the non-foam plastic plate.

5 Claims, 4 Drawing Sheets

(51) Int. Cl.
    *B29C 48/00*     (2019.01)
    *B29C 48/07*     (2019.01)
    *B29C 44/06*     (2006.01)
    *B29C 44/14*     (2006.01)
    *B29C 44/34*     (2006.01)
    *B32B 27/06*     (2006.01)
    *B32B 27/08*     (2006.01)
    *B32B 27/32*     (2006.01)
    *B29K 23/00*     (2006.01)
    *B29K 105/04*     (2006.01)
    *B29L 31/52*     (2006.01)

(52) U.S. Cl.
    CPC ...... *B29K 2023/06* (2013.01); *B29K 2023/12* (2013.01); *B29K 2105/048* (2013.01); *B29L 2031/5272* (2013.01); *B32B 2266/025* (2013.01)

(56) References Cited

U.S. PATENT DOCUMENTS

2013/0038041 A1     2/2013   Holzer et al.
2019/0184674 A1     6/2019   Yeh

FOREIGN PATENT DOCUMENTS

TW     201307060 A     2/2013
TW     201927382 A     7/2019

\* cited by examiner

FOAM PRODUCT AND MANUFACTURING METHOD THEREOF

FIELD OF INVENTION

The present invention relates to a foam product that is mainly used for sports, leisure or rescue operations, particularly, the structure and manufacturing method of the foam product.

RELATED PRIOR ART

Presently, foam products used in sports, leisure or rescue operations, such as a variety of surfboards, snowboards, paddle boards (SUP), grass/sand sleds, rescue boards and kickboards . . . etc., are basically made of a foam core, an upper foam sheet disposed on the top surface of the foam core, a lower foam sheet disposed on the bottom surface of the foam core, and a plastic bottom plate disposed on the bottom surface of the lower foam sheet. US Patent Publication No. US 2019/0184674 A1 have disclosed these type of foam product structures, wherein one of the structures can allow the foam product to have an invisible seam line when viewing from the bottom and the seam line is only visible when viewing the foam product from the sides. The visible seam line is very thin and situated between the plastic bottom plate and the upper foam sheet, this seam line is effectively, a periphery of the lower foam sheet that is highly compressed. Preferably, the thinner the seam line the better.

SUMMARY OF INVENTION

The present invention discloses a foam product comprising a foam core, an outer skin, a cross-linked foam sheet, a non cross-linked foam sheet, and a non foam plastic plate. The foam core has a top surface, a bottom surface, and a periphery. The outer skin has an inner surface laminated onto the top surface of the foam core. The cross-linked foam sheet has a top surface laminated onto the bottom surface of the foam core. The non cross-linked foam sheet has a top surface laminated to a bottom surface of the cross-linked foam sheet. The non foam plastic plate is laminated onto a bottom surface of the non cross-linked foam sheet.

In another aspect, the aforementioned outer skin of the present invention further covers to the periphery of the foam core and the periphery of the cross-linked foam sheet, but not exceeding over the bottom surface of the cross-linked foam sheet. The top surface of the non cross-linked foam sheet further covers to the periphery of the outer skin.

In another aspect, the aforementioned outer skin of the present invention comprises an upper foam sheet and a non-foam plastic film. The upper foam sheet is situated between the foam core and the non foam plastic film.

In another aspect, the aforementioned upper foam sheet of the present invention has the thickness larger than the cross-linked foam sheet, and the cross-linked foam sheet has the thickness larger than the non cross-linked foam sheet.

The present invention further discloses a method of manufacturing the foam product, in which the method comprises the steps of: laminating a top surface of a cross-linked foam sheet that is pre-made onto a bottom surface of a foam core that is pre-made; laminating an inner surface of an outer skin that is pre-made onto a top surface of the foam core; and laminating a bottom plate that is pre-made onto a bottom surface of the cross-linked foam sheet. In which, the bottom plate comprises a non cross-linked foam sheet and a non foam plastic plate laminating onto a bottom surface of the non cross-linked foam sheet and a top surface of the non cross-linked foam sheet is laminated onto the bottom surface of the cross-linked foam sheet.

In another aspect, the aforementioned cross-linked foam sheet and the foam core of the present invention are laminated comprising the following steps: inserting the cross-linked foam sheet into a cavity of a foam injection mold; injecting pre-puff expanded beads into the cavity of the foam injection mold; and injecting high temperature steam into the foam injection mold causing the pre-puff expanded beads to expand, cluster and form into the foam core.

In another aspect, the aforementioned bottom plate of the present invention is made comprising the following steps: extruding molten plastic materials from a die of an extrusion machine; conveying the non cross-liked foam sheet underneath the die of the extrusion machine so that the molten plastic materials coat onto the bottom surface of the non cross-linked foam sheet; and pressure rolling the non cross-linked foam sheet with a coating of the molten plastic materials by a roll stack.

Compared against the prior arts, the aforementioned foam product manufactured by the aforementioned method of the present invention has two layers; the aforementioned cross-linked foamed sheet and non-cross-linked foamed sheet. These two layers are sandwiched between the aforementioned foam core and the non foam plastic plate. This is a foam product structure that has not been seen in the field of art.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1-5, it shows a foam product, in a first preferred embodiment the foam product is a surf board, however, the foam product can also be of a SUP board, a snowboard, a toboggan, a snow and grass sled, a rescue board, a kickboard, a buoy or other foam products.

Figure 1:
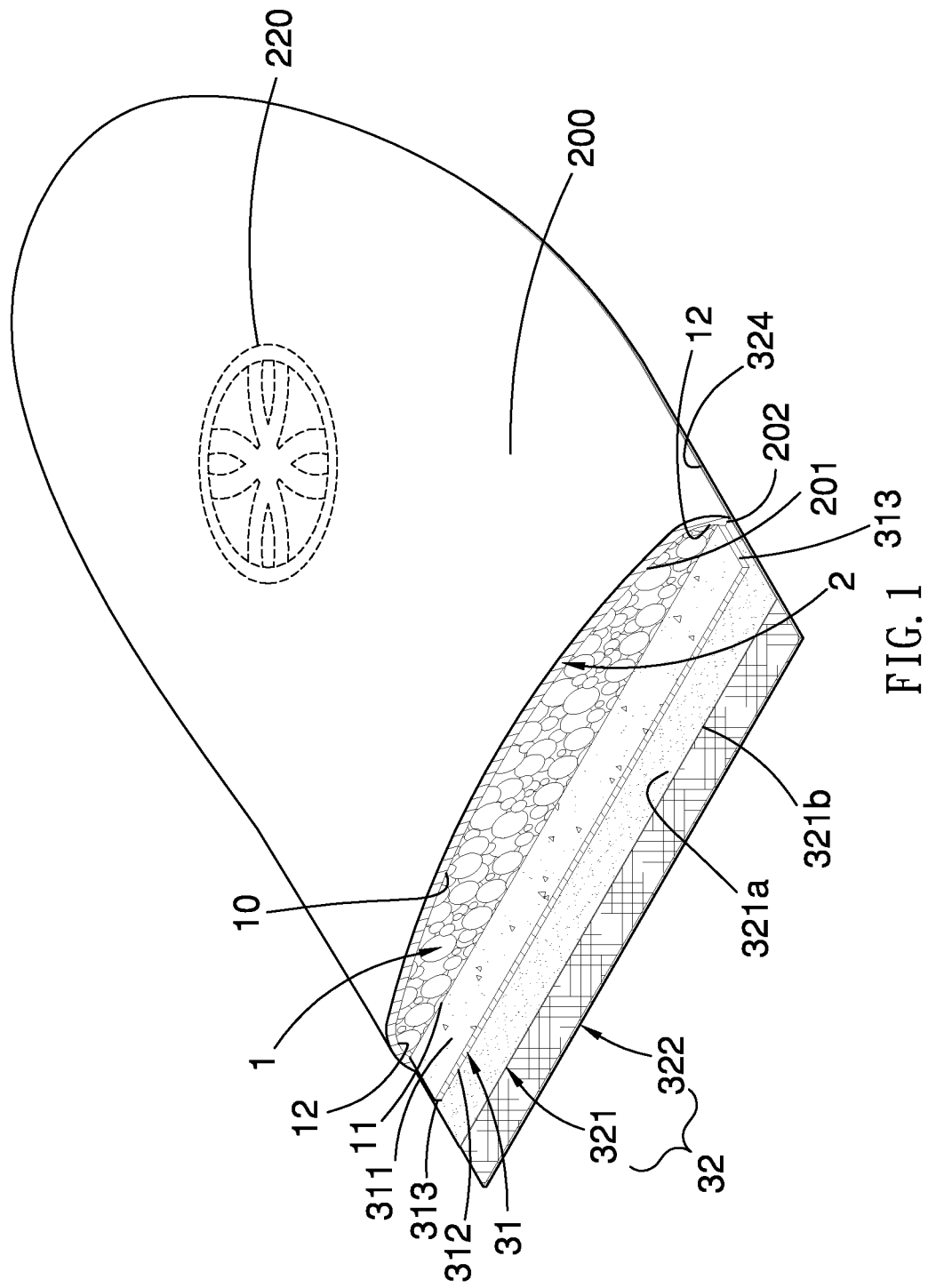
FIG. 1 is a perspective view of the front portion of a preferred embodiment of the foam product of the present invention.
Figure 2:
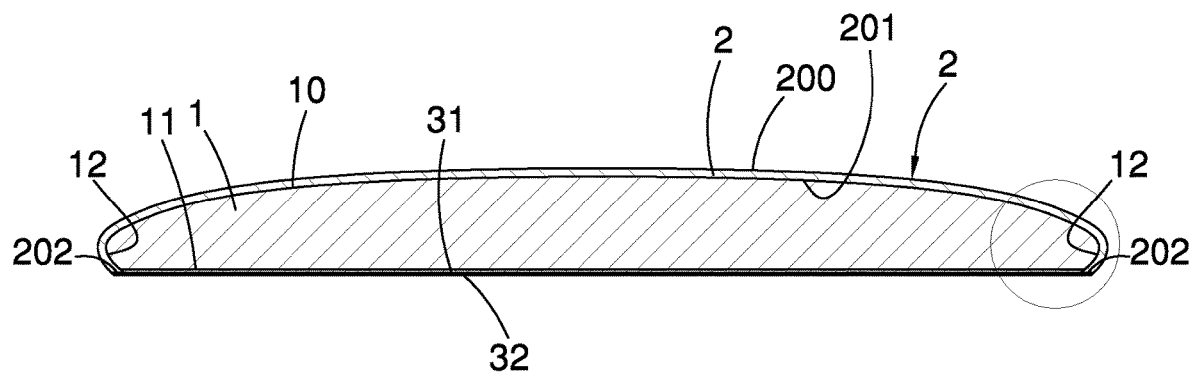
FIG. 2 is a cross-sectional schematic view of the preferred embodiment.
Figure 3:
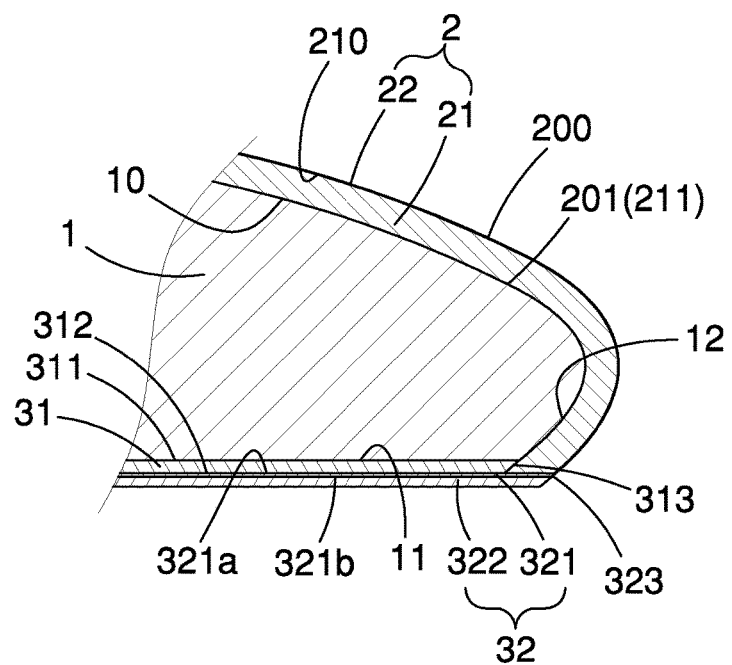
FIG. 3 is a partial enlarged view of FIG. 2.
Figure 4:
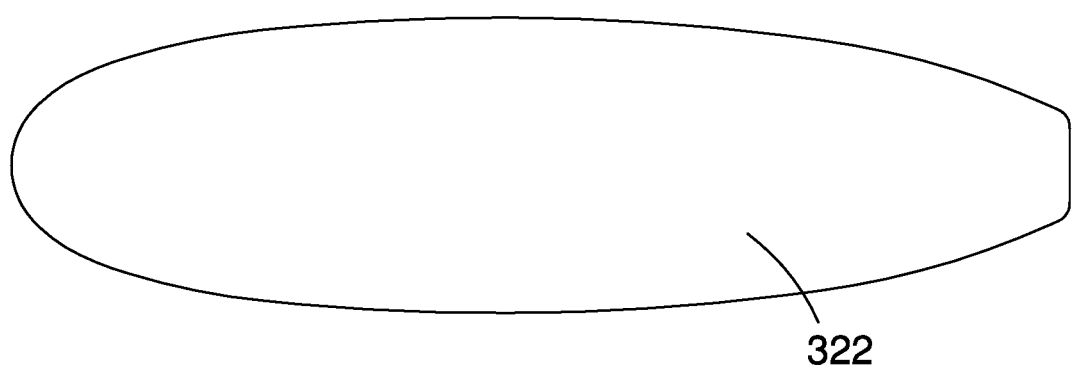
FIG. 4 is a bottom schematic view of the foam product of the present invention.
Figure 5:
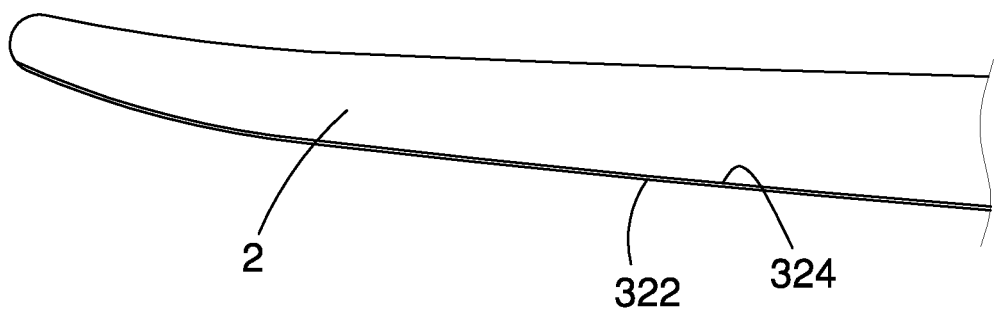
FIG. 5 is a schematic partial side view of the foam product of the present invention.

Referring to FIGS. 1-3, the foam product comprises a foam core 1, an outer skin 2, a cross-linked foam sheet 31, and a bottom plate 32. The bottom plate 32 comprises a non cross-linked foam sheet 321 and a non foam plastic plate 322. Preferably, the cross-linked foam sheet has an expansion ratio greater than the non cross-linked foam sheet 321.

The foam core 1 is made of plastic foam materials. The plastic foam materials can be of expanded polystyrene (EPS), expanded polyethylene (EPE), expanded polypropylene (EPP), or a mixture of expanded polystyrene and expanded polyethylene through the process of cross-linking, but not limited to so.

The outer skin 2 can be of a layer of foam skin, but can also be a foam skin comprising at least a layer or a plurality of composite skin layers. In this preferred embodiment, referring to FIG. 3, the outer skin 2 comprises an upper foam sheet 21 and a non foam plastic film 22. The non foam plastic film 22 is laminated onto the top surface 210 of the upper foam sheet 21. The outer foam sheet 21 can be a foam sheet of expanded polyethylene (EPE) or expanded polypropylene (EPP), the expansion ratio is preferably 15:1 (approximately 64 kg/m3 or 4 PCF after conversion), the thickness is around 2-6 mm, preferably 4 mm. The non foam plastic film 22 is preferably made of polyethylene with the thickness around 0.05-0.1 mm. In this preferred embodiment, the non foam plastic film 22 further comprises a printed pattern 220.

A cross-linked foam sheet 31 is a PE, PP, or other expanding foam sheet that has been mixed with chemical cross-linking agents or has undergone electron beam cross-linking process. The expansion ratio of the cross-linked foam sheet is preferably 30:1 (approximately 33 kg/m3 or 2.1 PCF after conversion), the thickness is preferably around 2 mm. The non cross-linked foam sheet 321 is a PE, PP, or other expanding foam sheet that has not been mixed with chemical cross-linking agents and has not undergone electron beam cross-linking process. The expansion ratio of the non cross-linked foam sheet 321 is preferably 20:1 (approximately 48 kg/m3 or 3 PCF after conversion). The original thickness of the non cross-linked foam sheet 321 is preferably around 2 mm, but the degree of thickness will be reduced as it is compressed (to be discussed later). The cross-linked foam sheet 31 has a hardness greater than the non cross-linked foam sheet 321, and therefore its thickness is less likely to be reduced when compressed. Conversely, comparing with the cross-linked foam sheet, the non cross-linked foam sheet is softer and therefore, its thickness is likely to be reduced when compressed.

As mentioned above, in terms of the foam expansion ratio, the cross-linked foam sheet 31 has an expansion ratio greater than the non cross-linked foam sheet 321, and the non cross-linked foam sheet 321 has an expansion ratio greater than the upper foam sheet 21. In terms of the thickness, the upper foam sheet 21 has a thickness greater than the cross-linked foam sheet 31; the cross-linked foam sheet 31 then has a thickness greater than the non cross-linked foam sheet 321.

Referring to FIGS. 1-3, the foam core 1 has a top surface 10, a bottom surface 11, and a periphery 12 situated between the top surface 10 and the bottom surface 11. The outer skin 2 has an outer surface 200, an inner surface 201, and a periphery 202 situated between the outer surface 200 and the inner surface 201. Wherein, the inner surface 201 of the outer skin 2 (that is a bottom surface 211 of the above mentioned upper foam sheet 21) is laminated onto the top surface 10 of the foam core 1.

The cross-linked foam sheet 31 has a top surface 311, a bottom surface 312, and a periphery 313 situation between the top surface 311 and the bottom surface 312. The non cross-linked foam sheet 321 has a top surface 321a and a bottom surface 321b. The top surface 311 of the cross-linked foam sheet 31 is laminated onto the bottom surface 11 of the foam core 1; the top surface 321a of the non cross-linked foam sheet 321 is laminated onto the bottom surface 312 of the cross-linked foam sheet 31. As for the non foam plastic plate 322, it is laminated onto the bottom surface 321b of the non cross-linked foam sheet 321.

In this preferred embodiment, the outer skin 2 further covers the periphery 12 of the foam core 1 and the periphery 311 of the cross-linked foam sheet 31, but the outer skin 2 does not exceed the bottom surface 312 of the cross-linked foam sheet 31. The top surface 312a of the non cross-linked foam sheet 321 further covers the periphery 202 of the outer skin 2. As the result, referring to FIG. 4, viewing from the bottom of the foam product, only the non foam plastic plate 322 would be visible, but none of the seam lines.

Figure 6:
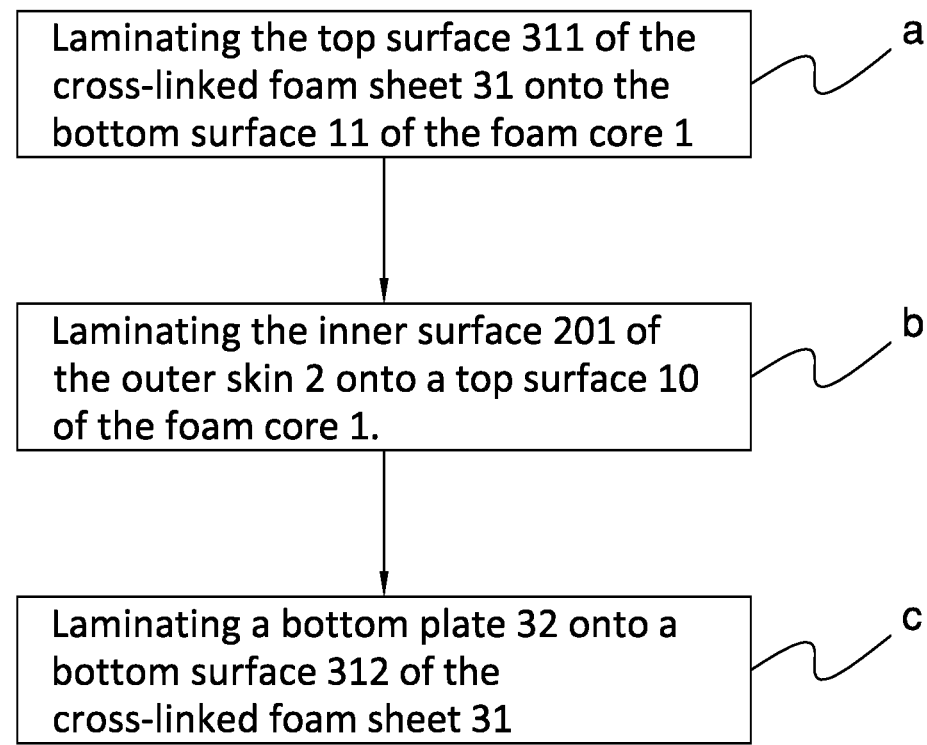
FIG. 6 is a flow chart of a preferred embodiment of the foam product manufacturing method of the present invention.

FIG. 6 shows a preferred embodiment of the method of manufacturing the foam product of the present invention, the method of manufacturing comprises the following steps a-c:

Firstly, as shown in step a, laminating the top surface 311 of the cross-linked foam sheet 31 onto the bottom surface 11 of the foam core 1. Secondly, as shown in step b, laminating the inner surface 201 of the outer skin 2 onto the top surface 10 of the foam core 1. As shown in step c, laminating the bottom plate 31 onto the bottom surface 312 of the cross-linked foam sheet 31. In which, the top surface 321a of the non cross-linked foam sheet 321 of the bottom plate 32 is laminated onto the bottom surface 312 of the cross-linked foam sheet 31.

In step a, the foam core 1 can be pre-made and subsequently heat laminate the cross-linked foam sheet onto the bottom surface 11 of the foam core 1. Alternatively, other methods to laminate the cross-linked foam sheet 31 to the foam core 1 can also be viable. For example: inserting the cross-linked foam sheet 31 into a cavity of a foam injection mold (not shown), then injecting the pre-puff expanded beads (e.g. pre-puff expanded PE beads) into the cavity of the foam injection mold. Next, injecting high temperature steam into the foam injection mold, causing the pre-puff expanded beads to expand, cluster and foil into the foam core 1 (e.g. PE foam core). Based on the previously mentioned steps, not only the foam core 1 can be manufactured, but the cross-linked foam sheet 31 can also be laminated onto the bottom surface 11 of the foam core 1.

Figure 7:
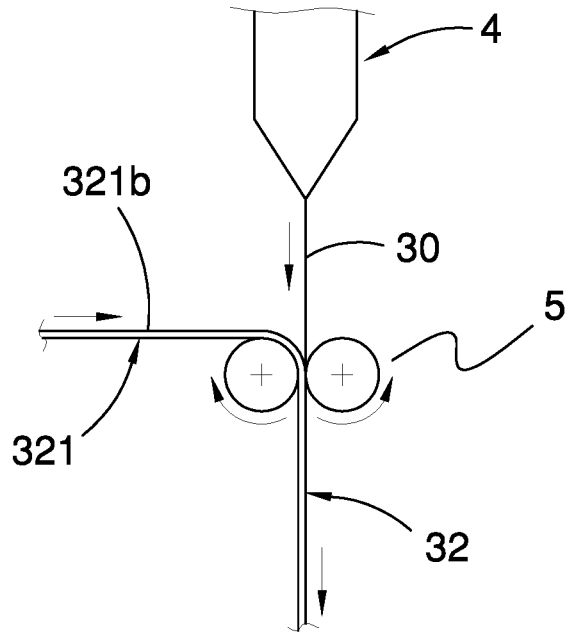
FIG. 7 is a schematic graph of the manufacturing of the bottom plate 32 of the present invention.

In step b, the outer skin 2 is pre-made and preferably heat laminated onto the top surface 10 of the foam core 1. In which, the outer skin 2 has an area size roughly equivalent to the top surface 10 of the foam core 1, so that the outer skin 2 only laminates onto the top surface 10. However, the outer skin 2 can also have an area size roughly equivalent to the top surface 10 and the periphery 12 of the foam core 1, so that the outer skin 2 not only laminates onto the top surface 10 but further reaching and covering the periphery 12. The bottom plate 32 mentioned in step c is pre-made. Referring to FIG. 7, an opening (not shown) of the extrusion die 4 of an extruder (not shown) continuously extrude molten plastic materials 30 (e.g. molten PE materials), then, continuously conveying the pre-made non cross-linked foam sheet 321 (e.g. non cross-linked PE foam sheet) underneath the opening of the extrusion die 4, so that the molten plastic materials 30 coat onto the bottom surface 321b of the non cross-linked foam sheet 321. Next, using a roll stack 5 to conduct pressure rolling onto the non cross-linked foam sheet 321 and the coating of the molten plastic materials 30 on the non cross-linked foam sheet 321. Thus, this concludes the manufacturing process of the bottom plate 32.

It should be pointed out that the molten plastic materials 30 that is being extruded out of the extrusion die 4 has the temperature around 220~240° C. This high temperature allows the immediate lamination of the bottom surface 321b of the non cross-linked foam sheet 321 and the molten plastic materials 30. During the lamination process, a small portion of the bottom surface 321b of the non cross-linked foam sheet 321 will melt and merge into the molten plastic materials 30, which then forms into the non foam plastic plate 322 of the bottom plate 32 so that the non foam plastic plate has the thickness larger than before. At the same time, the non cross-linked foam sheet 321 on the bottom plate 32 then subsequently has the thickness lesser than before due to the portion that has melted. The non foam plastic plate 322 formed from the process mentioned above has the thickness of 0.8 mm, but not limited to so. Nevertheless, the non foam plastic plate 322 should have the features of toughness and wear resistance, and it should also have a smooth bottom surface for sliding on a sliding surface (e.g. water surface).

In addition, in step c, as shown in FIG. 7, the pre-made bottom plate 32 is heat laminated onto the cross-linked foam sheet 31. Due to the non cross-linked foam sheet 321 on the bottom plate 32 having the nature of being able to compressed easily, therefore, after laminating the bottom plate 32 onto the cross-linked foam sheet 31, the non cross-linked foam sheet 321 will be compressed thinner to roughly 0.1~0.5 mm due to pressurizing during the lamination of the bottom plate process. As the result, referring to FIGS. 1 and 5, viewing the foam product from the side, only a very thin seam line 324 will be visible between the non foam plastic plate 322 and the outer skin 2. This seam line 324 is effectively a periphery of the compressed non cross-linked foam sheet 321; therefore, most people will only notice the non foam plastic plate 322 and the outer skin 2 of the foam product. The non cross-linked foam sheet 321 will hardly be visible and so does the cross-linked foam sheet 31 as it would already be covered by the outer skin 2.

What is claimed is:

1. A foam product comprising:
   a foam core having a top surface, a bottom surface, and a periphery;
   an outer skin having an outer surface, an inner surface, and a periphery, wherein the inner surface of the outer skin is laminated onto the top surface of the foam core;
   a cross-linked foam sheet having a top surface, a bottom surface, and a periphery, wherein the top surface of the cross-linked foam sheet is laminated onto the bottom surface of the foam core;
   a non cross-linked foam sheet having a top surface and a bottom surface, wherein the top surface of the non cross-linked foam sheet is laminated onto the bottom surface of the cross-linked foam sheet; and
   a non foam plastic plate laminated onto the bottom surface of the non cross-linked foam sheet;
   wherein the outer skin further covers the periphery of the foam core and the periphery of the cross-linked foam sheet, the outer skin does not exceed the bottom surface of the cross-linked foam sheet, wherein the top surface of the non cross-linked foam sheet covers the periphery of the outer skin.

2. The foam product as recited in claim 1, the outer skin further comprising an upper foam sheet and a non foam plastic film, wherein the upper foam sheet is located between the foam core and the non foam plastic film.

3. The foam product as recited in claim 2, the upper foam sheet having a thickness larger than the cross-linked foam sheet and the cross-linked foam sheet having a thickness larger than the non cross-linked foam sheet.

4. A foam product comprising:
   a foam core having a top surface, a bottom surface, and a periphery;
   an outer skin having an outer surface, an inner surface, and a periphery, wherein the inner surface of the outer skin is laminated onto the top surface of the foam core;
   a cross-linked foam sheet having a top surface, a bottom surface, and a periphery, wherein the top surface of the cross-linked foam sheet is laminated onto the bottom surface of the foam core;
   a non cross-linked foam sheet having a top surface and a bottom surface, wherein the top surface of the non cross-linked foam sheet is laminated onto the bottom surface of the cross-linked foam sheet, and the cross-linked foam sheet has a thickness larger than the non cross-linked foam sheet; and
   a non foam plastic plate laminated onto the bottom surface of the non cross-linked foam sheet.

5. The foam product as recited in claim 4, wherein the outer skin further covers the periphery of the foam core and the periphery of the cross-linked foam sheet, the outer skin does not exceed the bottom surface of the cross-linked foam sheet, wherein the top surface of the non cross-linked foam sheet covers the periphery of the outer skin.

* * * * *